Dec. 15, 1931. F. C. OWEN 1,836,615
TRANSFORMER FOR ELECTRIC ARC CUTTING AND WELDING APPARATUS
Filed Jan. 31, 1929 2 Sheets-Sheet 1
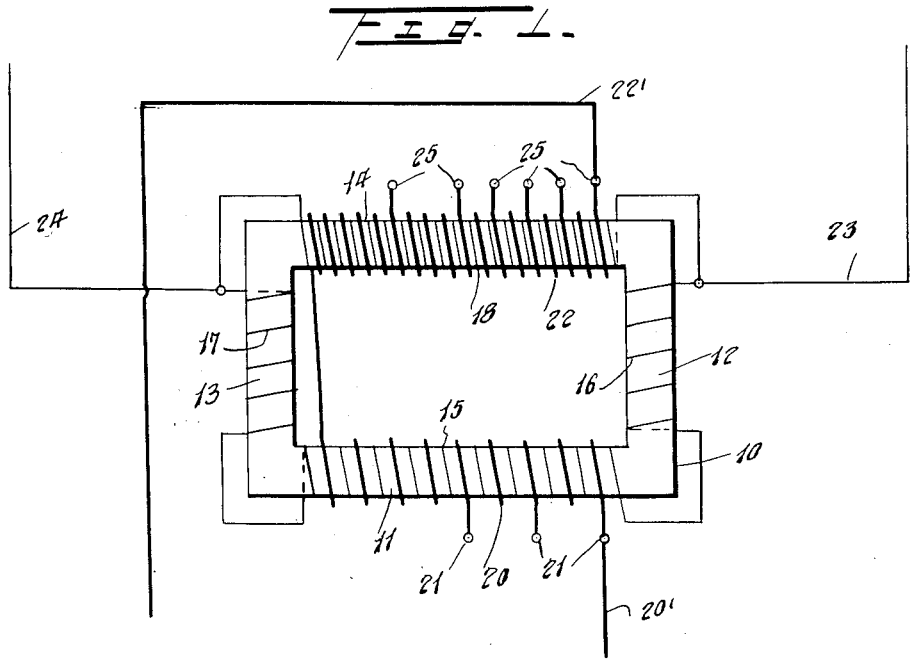
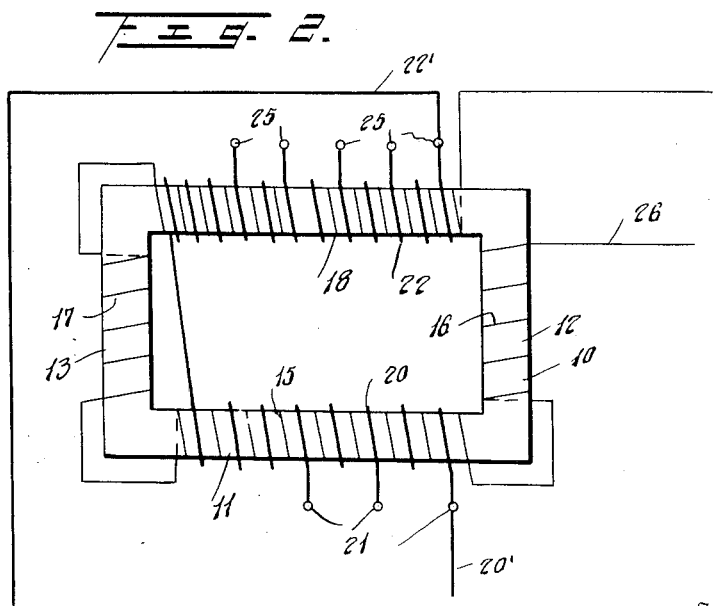
Inventor
F. C. Owen,

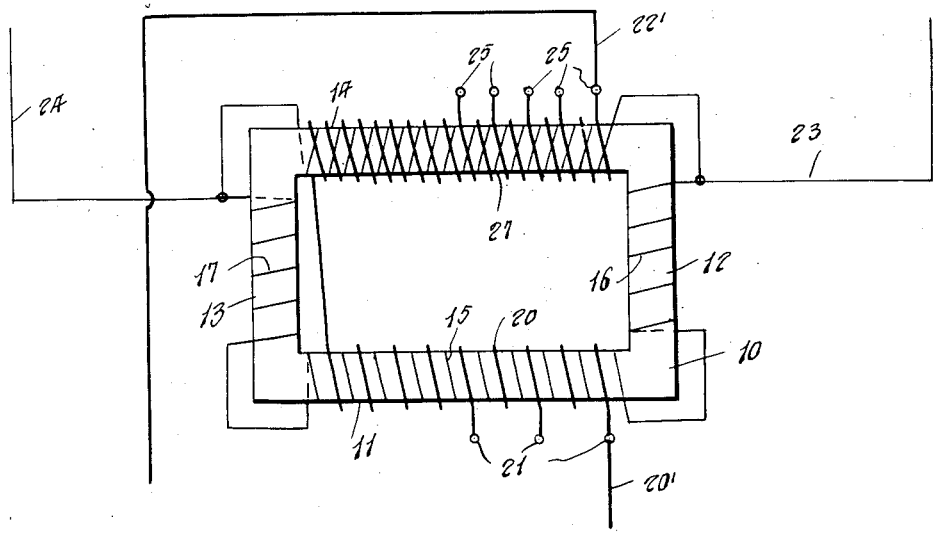
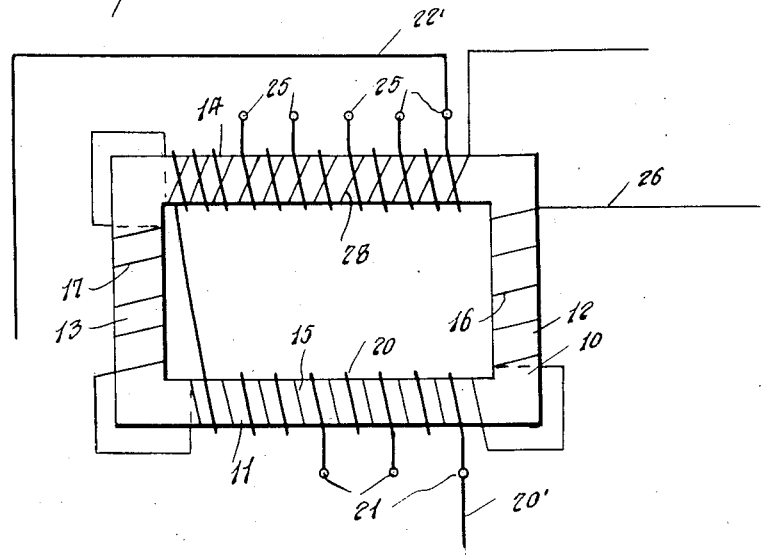

Patented Dec. 15, 1931

1,836,615

UNITED STATES PATENT OFFICE

FREDERICK C. OWEN, OF FAYETTEVILLE, NORTH CAROLINA

TRANSFORMER FOR ELECTRIC ARC CUTTING AND WELDING APPARATUS

Application filed January 31, 1929. Serial No. 336,530.

The present invention relates to improvements in alternating current electric arc cutting, repairing and welding apparatus and in some respects is specific to and an improvement upon the form shown in Figure 3 of Letters Patent 1,690,943 issued to me on November 6, 1928.

The present invention possesses the advantages of that disclosed in said Letters Patent and others issued to me and it relates in particular to a transformer having a completely closed circuit core. The present invention specifically, automatically stabilizes the welding current or secondary current by throwing together two or more strong opposing fluxes so that they may properly react upon each other, thereby at the same time enabling the apparatus embodying the same to attain maximum compactness, lightness in weight, the highest possible regulation in the secondary voltages and amperages, to result in the stabilized secondary current mentioned, and which it is impossible to be attained in transformers constructed along the old and known line. The apparatus thus gives the ideal welding current with the consumption of the least primary k. v. a., it being found that it takes only approximately one-half the k. v. a. from the primary line to operate applicant's transformer welders that is required to operate other types of alternating current welding devices constructed along the old and known method prior to the inventions heretofore patented by the applicant. The savings affected are possible by the grouping of the primary and secondary windings so that the fluxes generated in these windings may properly react upon each other without the usual losses that occur in transformers as heretofore constructed.

Various additional objects and advantages will become apparent and in part be pointed out in considering the following description taken in connection with accompanying drawings illustrating an operative embodiment and wherein:

Figure 1 diagrammatically shows a transformer constructed in accordance with my invention, Figure 2 shows a second form of transformer constructed in accordance with my invention, Figure 3 shows a third form of transformer constructed in accordance with my invention, and Figure 4 illustrates a fourth form of transformer constructed in accordance with the invention.

Referring first to the form of the invention shown in Figure 1, 10 designates a laminated core of rectangular formation consisting of legs 11, 12, 13 and 14 all connected together in non-adjustable relation.

The main sections of the primary winding of the transformer are shown at 15, 16 and 17 arranged on the legs 11, 12 and 13, respectively, which constitute the major portions of the core. The auxiliary section of the primary winding of the transformer consists of a coil 18 arranged on the leg or minor portion 14 of the core. The main secondary coil is shown at 20 surrounding the leg 15 and having taps 21 while the auxiliary secondary coil as at 22 surrounds the leg 14 and the ampere turns thereof are mingled with the ampere turns of the auxiliary primary winding 18. The secondary leads are shown at 20' and 22'. The coil 18 preferably carries more windings than the coil 15 and the primary coils are connected in parallel with leads 23 and 24. Coil 22 has taps as at 25. The auxiliary sections of the primary winding and the auxiliary secondary coils of these transformers set up fluxes in the minor portion of the core which oppose each other and are confined to the minor portion of the core by the fluxes generated by the main section of the primary winding.

In Figure 2, a diagrammatic arrangement is shown differing from Figure 1 only in that the primary coils are arranged in series in a conductor or lead 26, the numerals 10 to 22 and 25, identifying similar elements as in Figure 1. The number of turns of the coils 18 and 22 differ however as well as the number of taps 25.

In the case of either form of Figures 1 and 2, a portion of the primary may be reversely connected or arranged in opposition to the balance of the primary. For instance, as shown in Figure 3, the primary coil 27 which corresponds to primary coil 18 in Figure 1 is coiled or arranged in reverse or opposition to the other primary coils. All of the other reference characters besides 18 apply to Figure 3. In Figure 4, the primary 28 is arranged similarly to the primary 27 in Figure 3 and all of the other reference characters used in Figure 2 apply to Figure 4.

I claim as my invention:—

1. A transformer comprising a completely closed circuit core, primary windings thereon having their fluxes in opposed relation and secondary windings thereon arranged in series and one for each primary winding which set up fluxes in the same direction, whereby the flux of one secondary winding aids the flux of the other primary winding.

2. A transformer according to claim 1 wherein one of the primary windings has a greater number of turns than the other primary winding and the coacting secondary winding has a greater number of turns than the other secondary winding.

In testimony whereof I affix my signature.

FREDERICK C. OWEN.